United States Patent
Koizumi et al.

[11] Patent Number: 5,883,159
[45] Date of Patent: Mar. 16, 1999

[54] REINFORCED POLYPROPYLENE RESIN COMPOSITION

[75] Inventors: Junji Koizumi; Haruyasu Mizutani, both of Inazawa, Japan

[73] Assignee: Toyoda Gosei Co., Ltd., Aichi-ken, Japan

[21] Appl. No.: 284,734

[22] Filed: Aug. 1, 1994

Related U.S. Application Data

[63] Continuation of Ser. No. 83,178, Jun. 29, 1993, abandoned.

[30] Foreign Application Priority Data

| Jul. 3, 1992 | [JP] | Japan | 4-200257 |
| Jul. 17, 1992 | [JP] | Japan | 4-213670 |

[51] Int. Cl.$^6$ .................................................. C08K 9/32
[52] U.S. Cl. ................................ 523/217; 524/494
[58] Field of Search .................... 523/217; 524/494

[56] References Cited

U.S. PATENT DOCUMENTS

| 3,734,985 | 5/1973 | Greenberg | 264/123 |
| 3,766,135 | 10/1973 | Yamanouchi. | |
| 4,603,153 | 7/1986 | Sobajima et al.. | |
| 4,997,875 | 3/1991 | Geddes et al. | 524/504 |
| 5,079,281 | 1/1992 | Takeuchi et al.. | |

FOREIGN PATENT DOCUMENTS

| 2118390 | 11/1971 | Germany. |
| 63-67498 | 12/1988 | Japan. |
| 63-67499 | 12/1988 | Japan. |
| 64-6658 | 2/1989 | Japan. |
| 64-7618 | 2/1989 | Japan. |
| 64-9340 | 2/1989 | Japan. |
| 1-62333 | 4/1989 | Japan. |
| 1-32856 | 7/1989 | Japan. |
| 3-137150 | 6/1991 | Japan. |
| 4-12297 | 3/1992 | Japan. |

Primary Examiner—E. Rollins Buffalow
Attorney, Agent, or Firm—Cushman Darby & Cushman, IP Group of Pillsbury Madison & Sutro LLP

[57] ABSTRACT

A glass-fiber-reinforced polypropylene resin composition is provided having:
(A) at least one polypropylene resin,
(B) resin-coated glass fiber obtained by previous coating glass fiber with a thermoplastic resin, and
(C) glass fiber, wherein
the total content of the resins in the components (A) and (B), respectively, being 65 to 95% by weight based on the total weight of the components (A), (B) and (C),
the total content (G) of the glass fibers in the components (B) and (C) being 5 to 35% by weight based on the total weight of the components (A), (B) and (C), and
the melt flow rate M (g/10 min) of the polypropylene resin as component (A) and the above-mentioned total glass fiber content G (% by weight) satisfies the relationship:
M<1000/G.

The reinforced polypropylene resin composition provides a resin molded article having only small protuberances of welds, and a wheel cover having an excellent appearance quality and mechanical properties.

12 Claims, 3 Drawing Sheets

REINFORCED POLYPROPYLENE RESIN COMPOSITION

This application is a continuation of Ser. No. 08/083,178 filed Jun. 29, 1993, now abandoned.

BACKGROUND OF THE INVENTION

1. Field of the Invention

The present invention relates to a reinforced polypropylene resin composition having only small protuberances of welds when molded, and a wheel cover molded from the reinforced polypropylene resin composition having an excellent appearance quality, heat resistance and mechanical properties such as impact strength, stiffness and modulus in flexure.

2. Description of Related Art

Glass-fiber-reinforced polypropylene resin compositions (hereinafter referred to as reinforced PPG) are widely used in industrial products such as automobile parts, electric appliance parts, and the like, because they generally provide excellent mechanical strength, stiffness and heat resistance at a low cost. Specific examples of the automobile parts are engine compartment parts, such as a battery tray, core material for an instrument panel, timing-belt cover, fan shroud, and the like. Recently, employment of reinforced PPG compositions in external trims such as fenders, rocker panels, wheel covers, and the like has been investigated.

Wheel covers are used, for example, for protecting clamp bolts of wheels and improving the appearance of wheels on an automobile. Japanese Utility Model Registration Application Kokai No. 1-62333 and Japanese Patent Application Kokai No. 3-137150 disclose a reinforced PPG used as a material for wheel covers because of its excellent mechanical strength, stiffness, heat resistance and low cost.

However, the most serious problem in the employment of a reinforced PPG in external trims, including wheel covers, is that a resin molded article made of the reinforced PPG has a poor surface appearance quality because it contains glass fiber.

Therefore, for improving the surface appearance, there has been proposed: the addition of an inorganic substance such as barium sulfate, calcium carbonate, talc or the like in Japanese Patent Application Kokoku No. 1-32856; the employment of the most suitable diameter of glass fiber and the most suitable glass fiber finishing agent in Japanese Patent Application Kokoku No. 4-12297; the addition of fibrous calcium silicate in Japanese Patent Application Kokoku No. 63-67498; the addition of ethylene-α-olefin rubber in Japanese Patent Application Kokoku No. 63-67499; and the employment of the most suitable diameter of glass fiber, the most suitable glass fiber binder and the most suitable pigment component in Japanese Patent Application Kokoku Nos. 64-6658, 64-7618 and 64-9340.

In the conventional methods, the surface appearance is improved by preventing the glass fiber from rising to the surface of the resin molded article, improvement of the surface gloss, and prevention of silver streaks which are silver lines formed by glass fiber. The conventional methods are only slightly effective in improving the surface appearance.

Employment of a conventional reinforced PPG composition, however, is disadvantageous in that protuberances are formed on the welds of a molded article made of the reinforced PPG composition.

In general, the molded article is often produced by injection molding. For injection molding, in some cases, a molten resin is, as shown in FIG. 1(A) (prior art), casted through a plurality of gates 91 into the cavity of a mold. In other cases, as shown in FIGS. 1(B) (prior art) and 1(C) (prior art), the molded article 9, the product, has a shape with an opening 92 and a boss 95. In such cases, a plurality of resin flows are formed in the cavity, so that in the molded article 9, a weld 93 is formed in a place in which the flows coverage upon each other. For example, in the production of a wheel cover, a plurality of resin flows are formed in the cavity of a molding tool, so that, as shown in FIG. 2 (prior art), welds 93 are formed in the wheel cover 9 in places in which the resin flows 90 coverage. In FIG. 2, numeral 91 shows the position of a gate during molding and numeral 91, an air hole or a hole for heat dissipation of the wheel cover.

As shown in FIG. 3 (prior art), the weld 93 forms protuberances 8. The protuberances 8 are particularly high when a reinforced polypropylene resin composition containing glass fiber 82 is used, which deteriorates the surface appearance of the molded article. The height L of the protuberances reaches 40 to 100 $\mu$m using a conventional reinforced polypropylene resin composition.

In particular, because of the recent demand for improvement in decorative design and appearance, wheel covers are required to have various shapes, for example, the positions or shapes of the above-mentioned air holes are complicated or the air holes are enlarged. Therefore, the surface appearance at welds attracts considerable attention.

From the viewpoint of surface appearance, the height of the protuberances must be about 35 $\mu$m or less, preferably 30 $\mu$m or less.

For reducing the height of the protuberances, a method in which the length of glass fiber is reduced as much as possible (the average length is usually 300 $\mu$m or less) by intense kneading in a production process of a PPG material, and a method in which the amount of glass fiber added is reduced are known. These methods, however, are disadvantageous in that with a decrease of the height of the protuberances of welds, the mechanical properties such as impact strength, stiffness and modulus in flexure, and the heat resistance are deteriorated.

SUMMARY OF THE INVENTION

An object of the present invention is to provide a reinforced polypropylene resin composition which provides a molded article having only low protuberances of welds and has excellent appearance quality, heat resistance, and mechanical properties such as impact strength, stiffness and modulus in flexure.

Another object of the present invention is to provide a wheel cover which has only small protuberances of welds and has excellent appearance quality, heat resistance and mechanical properties such as impact strength, stiffness and modulus in flexure.

An embodiment of the present invention is a glass-fiber-reinforced polypropylene resin composition comprising:

(A) at least one polypropylene resin;
(B) resin-coated glass fiber obtained by previously coating glass fibers with a thermoplastic resin; and
(C) glass fiber, wherein
the total content of the resins in the components (A) and (B) combined is about 65 to about 95% by weight based on the total weight of the components (A), (B) and (C);
the total content (G) of the glass fibers in the components (B) and (C) combined is about 5 to about 35% by weight based on the total weight of the components (A), (B) and (C); and the melt flow rate M (g/10 min) of the polypropylene resin in component (A) and the total glass fiber content (G) satisfies the relationship:
M<1000/G.

Another embodiment of the present invention is a wheel cover which attaches to the wheel of an automobile, molded from a glass-fiber-reinforced polypropylene resin composition comprising:

(A) at least one polypropylene resin;
(B) resin-coated glass fiber obtained by previously coating glass fibers with a thermoplastic resin; and
(C) glass fiber, wherein
the total content of the resins in the components (A) and (B) combined is about 65 to about 95% by weight based on the total weight of the components (A), (B) and (C),
the total content (G) of the glass fibers in the components (B) and (C) combined is about 5 to about 35% by weight based on the total weight of the components (A), (B) and (C), and
the melt flow rate M (g/10 min) of the polypropylene resin in component (A) and the total glass fiber content (G) satisfies the relationship:
M<1000/G.

DESCRIPTION OF THE PREFERRED EMBODIMENT

Figure 1A:
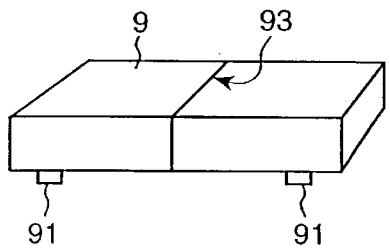
FIG. 1A (Prior Art) is an illustration of welds of a conventional resin molded article.
Figure 1B:
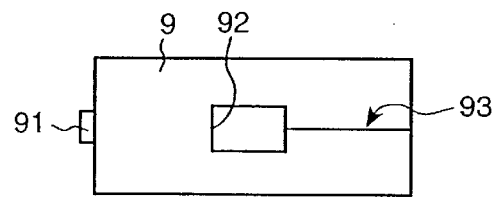
FIG. 1B (Prior Art) is an illustration of welds of a conventional resin molded article.
Figure 1C:
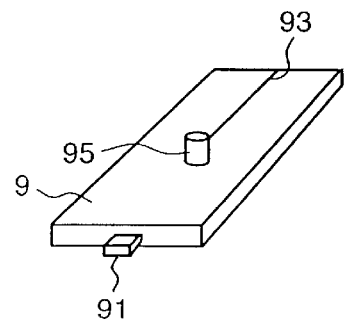
FIG. 1C (Prior Art) is an illustration of welds of a conventional resin molded article.

An embodiment of the present invention is a glass-fiber-reinforced polypropylene resin composition comprising:

(A) at least one polypropylene resin;
(B) resin-coated glass fiber obtained by previously coating glass fibers with a thermoplastic resin; and
(C) glass fiber, wherein
the total content of the resins in the components (A) and (B) combined is about 65 to about 95% by weight based on the total weight of the components (A), (B) and (C);
the total content (G) of the glass fibers in the components (B) and (C) combined is about 5 to about 35% by weight based on the total weight of the components (A), (B) and (C); and the melt flow rate M (g/10 min) of the polypropylene resin in component (A) and the total glass fiber content (G) satisfies the relationship:
M<1000/G.

Another embodiment of the present invention is a wheel cover which attaches to the wheel of an automobile, molded from a glass-fiber-reinforced polypropylene resin composition comprising:

(A) at least one polypropylene resin;
(B) resin-coated glass fiber obtained by previously coating glass fibers with a thermoplastic resin; and
(C) glass fiber, wherein
the total content of the resins in the components (A) and (B) combined is about 65 to about 95% by weight based on the total weight of the components (A), (B) and (C), the total content (G) of the glass fibers in the components (B) and (C) combined is about to about 35% by weight based on the total weight of the components (A), (B) and (C), and
the melt flow rate M (g/10 min) of the polypropylene resin in component (A) and the total glass fiber content (G) satisfies the relationship:
M<1000/G.

The polypropylene resin can be, for example, crystalline polypropylene resins, crystalline ethylenepropylene copolymers, crystalline propylenepolymers modified with an unsaturated organic acid or its derivative, and mixtures thereof. Examples of the unsaturated organic acid include acrylic acid, maleic acid, itaconic acid or maleic anhydride.

Preferred polypropylene resins are a combination of a crystalline ethylene-propylene block copolymer and a modified crystalline polypropylene.

From the viewpoint of the balance among impact resistance, stiffness and strength, it is preferable that the crystalline ethylene-propylene block copolymer contains about 3 to about 12% by weight of ethylene units.

The modified crystalline polypropylene is most preferably obtained by addition of maleic anhydride in a proportion of about 0.1 to about 2% by weight of the crystalline polypropylene. The amount of the modified crystalline polypropylene is preferably in a proportion of about 2 to about 20% by weight based on the total weight of the PPG. The addition of the modified crystalline polypropylene further improves the mechanical properties such as impact resistance, stiffness, and strength.

The melt flow rate of the polypropylene resin is preferably about 1 to about 100 (g/10 min). When the melt flow rate is less than about 1 (g/10 min), the fluidity is low, so that the moldability is not satisfactory. On the other hand, when the melt flow rate exceeds about 100 (g/10 min), the impact resistance deteriorates.

In particular, for a wheel cover, the melt flow rate of the polypropylene resin is preferably about 20 to about 67 (g/10 min). When the melt flow rate is less than about 20 (g/10 min), the fluidity is low, so that glass fiber rises to the surface, resulting in a low surface gloss. On the other hand, when the melt flow rate exceeds about 67 (g/10 min), the protuberances of welds becomes too high.

The resin-coated glass fiber can be glass fiber previously coated with a thermoplastic resin and shaped into cylindrical pellets.

The resin-coated glass fiber can be obtained by coating the interior and exterior of a long bundle of glass fibers, for example, by impregnation of a thermoplastic resin, curing the resin, and then cutting the bundle into pellets. Therefore, the glass fiber has the same length as that of the pellet.

The length of the resin-coated glass fiber is preferably about 1 to about 20 mm. When the length exceeds about 20 mm, the height of the protuberances of welds is too large. When the length is less than about 1 mm, the impact strength and the modulus in flexure tend are insufficient.

The diameter of the glass fiber in the resin coated glass fiber is preferably about 10 to about 25 $\mu$m.

The thermoplastic resin in the resin coated glass fiber includes polypropylenes, polyethylenes, nylons, and the like. Of these, the polypropylenes are most preferable because of their good miscibility with the polypropylene of component (A). The same polypropylene resin in the thermoplastic resin as the polypropylene resin in component (A) can be used. Polypropylene resins similar to each other in composition and fluidity are preferably used from the viewpoint of the miscibility with each other.

The content of the thermoplastic resin in the resin-coated glass fiber is about 20% by weight or more. When the content is less than about 20% by weight, bundling of glass fiber is not satisfactory, resulting in difficult handling. The upper limit of the content is preferably about 70% by weight for economical benefit.

The glass fiber in component (C) is in the form of uncoated chopped strands, unlike the resin coated glass fiber. The glass fiber has preferably been subjected to a surface treatment with aminosilane, epoxysilane, vinylsilane or the like. The glass fiber preferably has a diameter of about 3 to about 20 $\mu$m. The length of the glass fiber is preferably about 1 to about 10 mm. When the length is less than about 1 mm, the impact strength and modulus in flexure of a resin molded article obtained from the composition are insufficient. When the length exceeds about 10 mm, the dispersion of the glass fiber in the resins is unsatisfactory.

Although not critical, the content of the glass fiber in the component (B) is preferably about 20 to about 80% by weight based on the weight of the component (B). For economical benefit, the content of the glass fiber is preferably as high as possible, in a range of about 40 to about 80% by weight. Therefore, the content of the thermoplastic resin in the component (B) is about 20 to about 80% by weight, preferably about 20 to about 60% by weight based on the weight of the component (B).

The total content (G) of the glass fibers in the components (B) and (C) is about 5 to about 35% by weight, preferably about 15 to about 35% by weight. When the total content (G) is less than about 5% by weight, the reinforcing effect of the glass fibers is insufficient and in particular, the impact resistance is insufficient. When the total content (G) exceeds about 35% by weight, the appearance quality, in particular the protuberances of welds, is not improved even by using the most suitable polypropylene resin.

From the viewpoint of the appearance quality, it is most preferable to make the amount of glass fiber in the component (B) less than that in the component (C).

The total content of the synthetic resins, for example, the polypropylene resin in component (A) and the thermoplastic resin in component (B), is about 65 to about 95% by weight, preferably about 65 to about 85% by weight.

There is the relationship M<1000/G between the melt flow rate (g/min) of the polypropylene resin in component (A) and the total glass fiber content (G). If this relation is not satisfied, the height of the protuberances of welds will be too large.

For producing the composition of the present invention, various processes can be employed. For example, there can be employed a process which comprises premixing the above-mentioned components by means of a Henschel mixer, ribbon blender or the like, and feeding the mixture to a kneading machine such as a single screw extruder, twin screw extruder, kneader or the like, followed by melt kneading and granulation. It is also possible to feed the glass fiber alone through the vent of an extruder in the course of the production.

If necessary, the composition of the present invention can contain various additives such as heat stabilizers, light stabilizers, ultraviolet absorbers, antistatic agents, lubricants, flame retardants, colorants, and the like.

For fine adjustment of physical properties, the cost, and the like, there can also be added elastomers such as ethylene-based rubbers, for example, ethylene-propylene copolymer rubber, ethylene-propylene-diene copolymer rubber and ethylene-butene-1 copolymer rubbers; styrene-based rubbers, for example, styrene-butadiene-styrene copolymer rubber, styrene-ethylenebutylene-styrene copolymer rubber; and various fillers, for example, talc, calcium carbonate, mica, barium sulfate, whisker, clay, and the like.

The component (B) brings about the following enhanced effects. When a material obtained according to prior art and a material obtained according to the present invention are compared in physical properties by using the same amount of glass fiber in the two materials, the latter is equal to the former in the height of the protuberances of welds, namely, equal to the former in appearance quality and is superior to the former in Izod impact strength, modulus in flexure and heat deformation temperature.

In other words, after attaining equal physical properties, the amount of glass fiber added can be reduced and the appearance quality of a molded article, for example, a wheel cover, obtained from the composition can be improved.

When the components (A), (B) and (C) according to the present invention are melt-kneaded by means of an extrusion kneader or the like, the component (C) is considerably broken by the extrusion kneader or the like irrespective of the fiber length of starting glass fiber, so that the average fiber length becomes about 400 to about 500 $\mu$m.

The glass fibers in the component (B) are more difficult to break than the glass fibers in component (C) because they are coated with the thermoplastic resin. Therefore, the average fiber length is as long as, for example, about 700 to about 800 $\mu$m, even after kneading.

Accordingly, it is expected that in the resin molded article such as wheel cover, short glass fibers and long glass fibers are mixed as a result of the above to provide an excellent appearance quality and excellent mechanical properties.

The invention will be further described using the following non-limiting examples.

EXAMPLES

Figure 3:
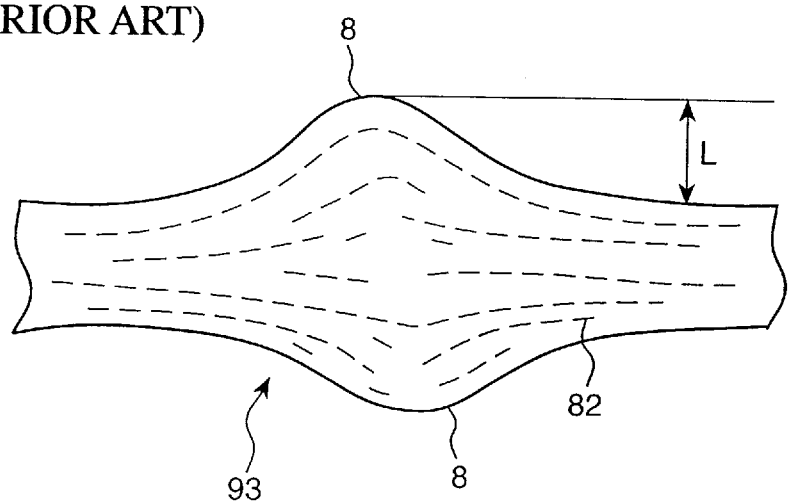
FIG. 3 (Prior Art) is an illustration of a protuberance of a conventional weld.

The above-mentioned components (A) to (C) were mixed in various proportions (by weight), melt-kneaded with a 30-mm twin screw extruder, and then granulated. Using the resulting granules, molded articles as shown in FIG. 3 for testing were obtained by injection molding, Examples 1 to 15.

The molded articles were measured for modulus in flexure (kg/cm$^2$), heat deformation temperature (° C.), Izod impact strength at 23° C. (kg-cm/cm), the height of the protuberance of a weld ($\mu$m) and gloss (%).

Table 1 shows the proportions of the above-mentioned components and the results of the measurements. Table 1 also shows, for comparison, the proportions of the components and measurement results in Comparative Examples C1 to C11 in which the melt flow rate M, the proportions of the components, and the like were outside the ranges specified in the present invention.

As the components listed in Table 1, the following were used. As the polypropylene resin in component (A) according to the present invention, a combination of a polypropylene and a modified polypropylene polymer was used. The polypropylene used was crystalline ethylene-propylene block copolymers containing 7% by weight of ethylene units (MITSUBISHI POLYPRO BC SERIES manufactured by Mitsubishi Petrochemical Company Limited). These copolymers had a melt flow rate M of 15, 30, 45 or 80 (9/10 min), respectively. The modified polypropylene polymer used was a crystalline polypropylene (homopolymer) modified with maleic anhydride (ADMER QE-05 manufactured by Mitsui Petrochemical Industries, Ltd.).

The resin-coated glass fiber used was a product obtained by coating a bundle of glass fibers having a diameter of 15 to 20 μm and a length of 6 to 7 mm with a polypropylene resin by impregnation (CELSTRAN G50-4 manufactured by Polyplastics Co., Ltd.).

The polypropylene resin used was a crystalline ethylene-propylene block copolymer having a melt flow rate of 45 (g/10 min) as described above for the component (A) (MITSUBISHI POLYPRO BC SERIES manufactured by Mitsubishi Petrochemical Company Limited).

The resin-coated glass fiber was cut to form cylindrical pellets having a length of 6 to 7 mm, which was the same length as that of the glass fiber, and diameters of 2×3 mm (oval). The content of the glass fiber in the resin-coated glass fiber was 50% by weight.

In Example 10, resin-coated glass fiber having a glass fiber length and a pellet length of 3 to 3.5 mm was used. In Comparative Example C10, uncoated glass fiber chopped strands having a diameter of about 13 μm and lengths of 3 mm and 6 mm were used in proportions of 15% and 5%, respectively.

The glass fiber in component (C) was chopped strands having a diameter of about 13 μm and a length of 3 mm. In Comparative Example C11, chopped strands having a diameter of about 13 μm and a length of 3 mm and chopped strands having a diameter of about 13 μm and a length of 6 mm were used in proportions of 15% and 5%, respectively.

In the section "Resin-coated glass fiber" in Table 1, there is shown the total amount of the glass fiber and the polypropylene resin in the resin-coated glass fiber. As described above, the glass fiber comprises 50% of the resin-coated glass fiber. In the section "Total glass fiber content G" in Table 1, there is shown the total (% by weight) of the content of the glass fiber comprising 50% of the resin-coated glass fiber and the content of the glass fiber in component (C).

In Table 1, the modulus in flexure was measured according to ASTM-D790, the heat deformation temperature according to ASTM-D648 (18.6 kg/cm² load), and the Izod impact strength according to ASTM-D256 (notched).

Figure 4:
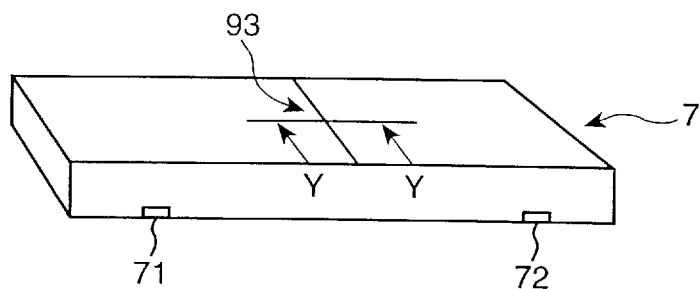
FIG. 4 is an illustration of a weld.
Figure 5:
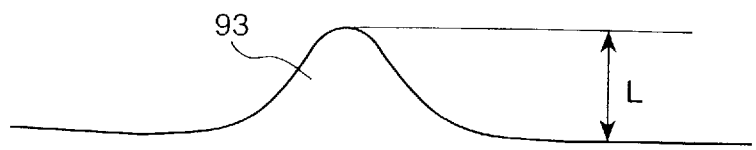
FIG. 5 is an illustration of the height of protuberance of a weld, which is along the line Y—Y of FIG. 3 and from the direction of the arrows.

The height of the protuberance of a weld was measured as follows. As shown in FIG. 4, a box-form resin molded article was produced using double gate 71 and 72, and as shown in FIG. 5. The height L of protuberance of the weld 93 of the molded article was measured using a surface roughness meter (Surftone 550AD, Tokyo Seimitsu Co., Ltd.) used.

The gloss was measured according to JIS K6758, which is equivalent to ASTM D523 using the value of 45°.

The results of the above measurements are explained below.

Figure 6:
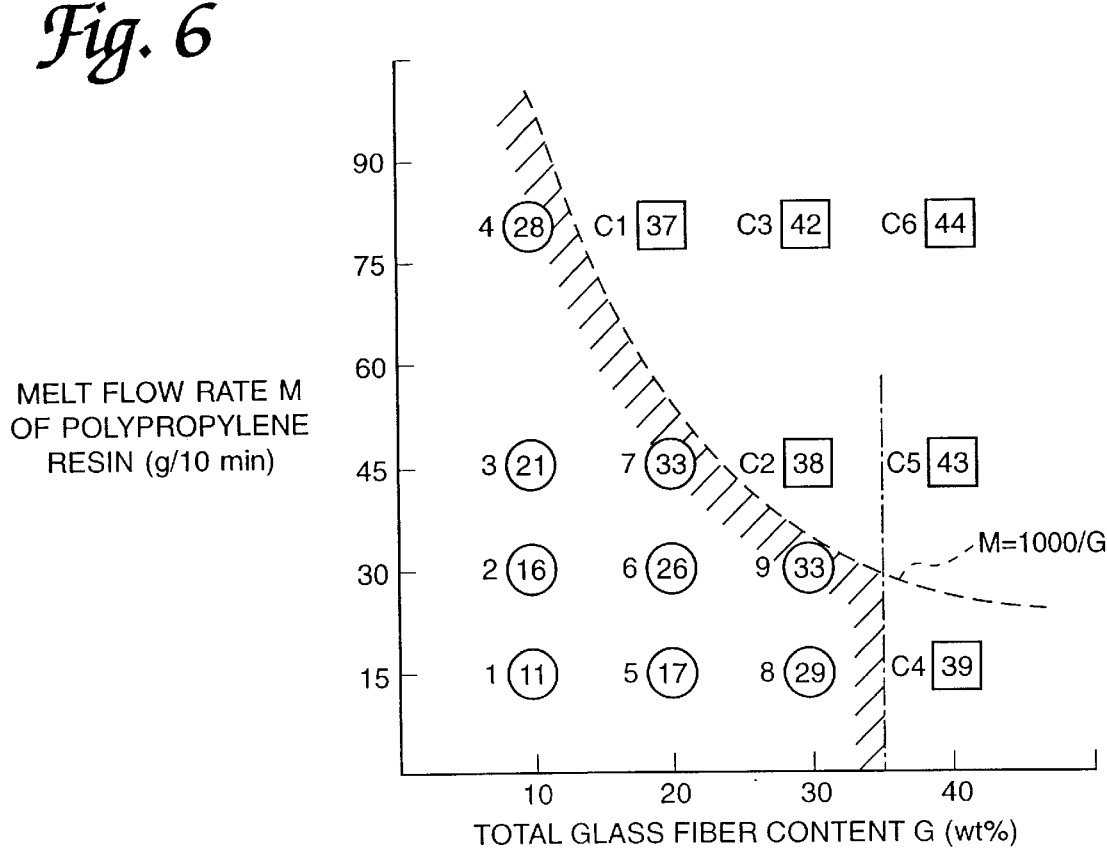
FIG. 6 is an illustration showing the height of the protuberances of welds in a relationship between total glass fiber content and the melt flow rate of polypropylene resins in the Examples and Comparative Examples.

FIG. 6 shows a relationship between the total glass fiber content G and the melt flow rate M (g/10 min) of the polypropylene resin which was determined for the above Examples 1 to 9 and Comparative Examples C1 to C6 by plotting the melt flow rate M against the total glass fiber content G. In each case, the height (μm) of protuberance of the weld was expressed by a figure enclosed within a circle for the examples, or a figure enclosed within a square for the comparative examples.

As can be seen from FIG. 6, in Examples 1 to 12, 14 and 15 according to the present invention, the height of the protuberance is 33 μm or less. On the other hand, in Comparative Examples C1 to C3, C5 and C6, the height of the protuberance is 37 μm or more. In Comparative Example C4 in which the total glass fiber content G was 40%, the height of the protuberance is 39 μm.

In the boundary area between Examples 1 to 12, 14 and 15 and Comparative Examples C1 to C3, C5 and C6, a line showing the relation M=1000/G can be drawn as shown in FIG. 6.

From the above, it can be seen that when the total glass fiber content is 35% or less, the height of the protuberance becomes 35 μm or less.

Figure 7:
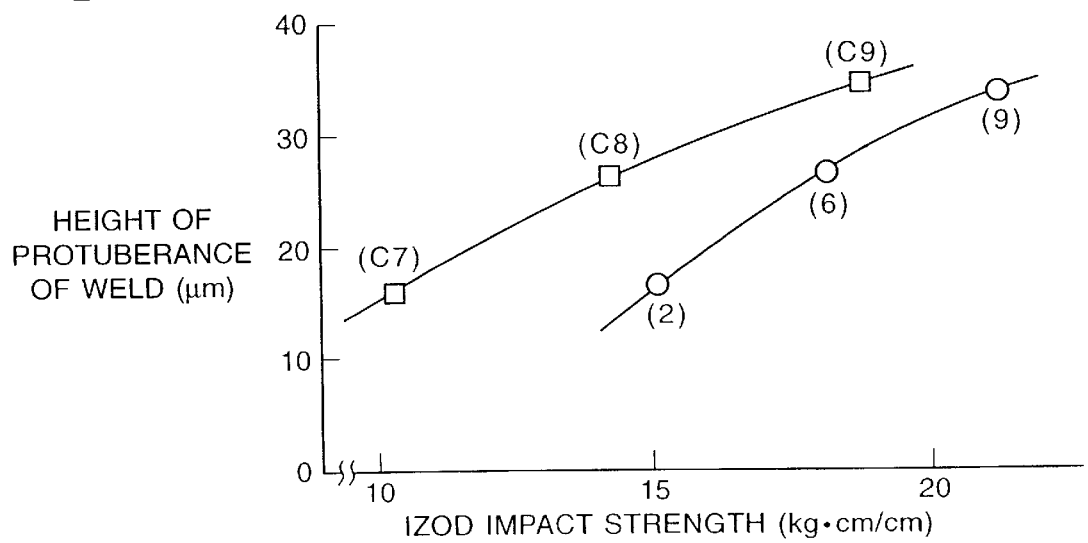
FIG. 7 is an illustration showing a relationship between Izod impact strength and the height of the protuberances of welds in the Examples and Comparative Examples.

FIG. 7 shows a plot of the height of the protuberance against Izod impact strength, for Examples 2, 6 and 9, which are represented by circles, and Comparative Examples C7, C8 and C9, which are represented by squares.

As can be seen from FIG. 7 and Table 1, according to the present invention, the impact strength is surprisingly higher even when the height of the protuberance is the same, compared to conventional molded wheel covers. For example, in Example 2 according to the present invention, the height of the protuberance is substantially the same as in Comparative Example C7 but the impact strength is remarkably higher in Example 2. In Comparative Example C7, the impact strength is considerably low and is not sufficient for practical purposes.

In Example 15, in which an ethylene-propylene copolymer rubber was added, the height of the protuberance is small and the impact strength is high.

According to the present invention, the impact strength can be increased while keeping the height of the protuberances small.

TABLE 1

| No. | | | Example | | | | | | |
|-----|---|---|---|---|---|---|---|---|---|
| | | | 1 | 2 | 3 | 4 | 5 | 6 | 7 |
| A | Polypropylene | M = 15 | 80 | | | | 70 | | |
| | | M = 30 | | 80 | | | | 70 | |
| | | M = 45 | | | 80 | | | | 70 |
| | | M = 80 | | | | 80 | | | |

TABLE 1-continued

| | | | | | | | | |
|---|---|---|---|---|---|---|---|---|
| | Modified polypropylene | 5 | 5 | 5 | 5 | 5 | 5 | 5 |
| B | Resin-coated glass fiber (GF 50%) | 10 | 10 | 10 | 10 | 10 | 10 | 10 |
| C | Glass fiber | 5 | 5 | 5 | 5 | 15 | 15 | 15 |
| G | Total glass fiber content | 10 | 10 | 10 | 10 | 20 | 20 | 20 |
| Measurement results | Modulus in flexure (kg/cm$^2$) | 20,600 | 20,800 | 21,000 | 20,800 | 32,400 | 33,100 | 33,000 |
| | Heat deformation temp. (°C.) | 126 | 126 | 127 | 127 | 144 | 144 | 144 |
| | Izod impact strength (kg · cm/cm) | 15.5 | 15.1 | 14.7 | 14.0 | 18.8 | 18.2 | 17.7 |
| | Height of the protuberance of a weld (μm) | 11 | 16 | 21 | 28 | 17 | 26 | 33 |
| | Gloss (%) | | 28 | | | 12 | 23 | 26 |

| | | | Comparative Example | Example | | Comparative Example | | | | | | | |
|---|---|---|---|---|---|---|---|---|---|---|---|---|---|
| No. | | | C1 | 8 | 9 | C2 | C3 | C4 | C5 | C6 | C7 | C8 | C9 |
| A | Polypropylene | M = 15 | | 60 | | | | 50 | | | | | |
| | | M = 30 | | | 60 | | | | | | 85 | 75 | 65 |
| | | M = 45 | | | | 60 | | | 50 | | | | |
| | | M = 80 | 70 | | | | 60 | | | 50 | | | |
| | Modified polypropylene | | 5 | 5 | 5 | 5 | 5 | 5 | 5 | 5 | 5 | 5 | 5 |
| B | Resin-coated glass fiber (GF 50%) | | 10 | 10 | 10 | 10 | 10 | 10 | 10 | 10 | — | — | — |
| C | Glass fiber | | 15 | 25 | 25 | 25 | 25 | 35 | 35 | 35 | 10 | 20 | 30 |
| G | Total glass fiber content | | 20 | 30 | 30 | 30 | 30 | 40 | 40 | 40 | 10 | 20 | 30 |
| Measurement results | Modulus in flexure (kg/cm$^2$) | | 33,100 | 45,900 | 46,500 | 46,400 | 46,100 | 57,300 | 57,100 | 57,500 | 20,200 | 31,800 | 45,600 |
| | Heat deformation temp. (°C.) | | 144 | 147 | 148 | 148 | 148 | 148 | 148 | 148 | 124 | 140 | 146 |
| | Izod impact strength (kg · cm/cm) | | 17.3 | 21.6 | 21.3 | 21.2 | 21.2 | 25.4 | 25.3 | 25.0 | 10.3 | 14.3 | 18.8 |
| | Height of the protuberance of a weld (μm) | | 37 | 29 | 33 | 38 | 42 | 39 | 43 | 44 | 15 | 24 | 32 |
| | Gloss (%) | | 27 | | 17 | 20 | | | | | | 24 | |

| | | | Example | | | | Comparative Example | Example | | Comparative Example |
|---|---|---|---|---|---|---|---|---|---|---|
| No. | | | 10 | 11 | 12 | 13 | C10 | 14 | 15 | 11 |
| A | Polypropylene | M = 15 | | | | | | | | |
| | | M = 30 | | | | | | | | |
| | | M = 45 | 70 | 72.5 | 67.5 | 62.5 | 70 | 74 | 67 | 75 |
| | | M = 80 | | | | | | | 3 (Note 2) | |
| | Modified polypropylene | | 5 | 5 | 5 | 5 | 5 | 5 | 5 | 5 |
| B | Resin-coated glass fiber (GF 50%) | | 10 | 5 | 15 | 25 | | 4 (Note 1) | 10 | |
| C | Glass fiber | | 15 | 17.5 | 12.5 | 7.5 | 15 + 5 | 17 | 15 | 15 + 5 |
| G | Total glass fiber content | | 20 | 20 | 20 | 20 | 20 | 20 | 20 | 20 |
| Measurement results | Modulus in flexure (kg/cm$^2$) | | 33,000 | 32,700 | 33,400 | 33,600 | 32,200 | 32,600 | 32,200 | 32,200 |
| | Heat deformation temp. (°C.) | | 144 | 144 | 144 | 144 | 141 | 144 | 142 | 141 |
| | Izod impact strength (kg · cm/cm) | | 18.3 | 17.9 | 18.6 | 19.5 | 14.9 | 17.3 | 18.8 | 14.9 |
| | Height of the protuberance of a weld (μm) | | 25 | 25 | 29 | 35 | 24 | 24 | 23 | 24 |
| | Gloss (%) | | | | | | | 25 | 21 | 23 |

Note 1:
glass fiber content: 70 wt %
Note 2:
An ethylene-prpylene copolymer rubber [propylene unit content 21 wt %, Mooney viscosity 15 (ML$_{1+4}$ 100° C.)] was used in a proportion of 3 wt %.

Example 16

Figure 2:
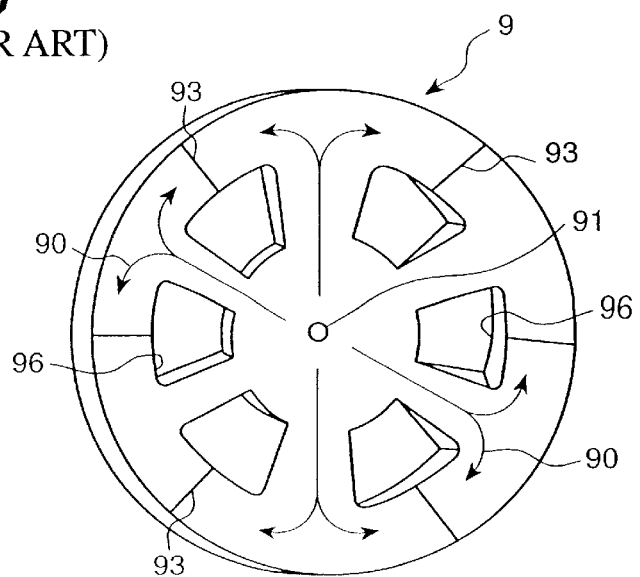
FIG. 2 (Prior Art) is an illustration of a weld of a conventional wheel cover.

A wheel cover as shown in FIG. 2 was produced by injection molding each of the PPG's shown in Examples 2, 5, 6, 7, 9, 14 and 15 and Comparative Examples C1, C2, C8 and C11. The wheel covers thus obtained were subjected to product testing.

The results obtained are shown in Table 2 with reference to the product numbers of the wheel covers obtained by using each of the compositions corresponding to the above examples and comparative examples, respectively.

The wheel covers had the shape shown in FIG. 2, a diameter of 39 cm, an average thickness of 2.5 mm and 6 fan-shaped air holes in total. The dimensions of the air hole were approximately 6 cm×3.5 cm×4 cm.

The tests, the evaluation of product appearance and the overall evaluation which are shown in the column "Test" in Table 2 were carried out as follows.

Attachment-detachment repetition test:

Attachment of each wheel cover to a wheel disc and its detachment were repeated and the occurrence of a trouble such as cracking was investigated.

○: No trouble such as cracking occurred even when the attachment and detachment were repeated 30 times.

Heat resistance test:

Each wheel cover was placed in a thermostatic chamber at 120° C. and its dimensional change and deformation after 24 hours were measured.

○: No marked heat deformation occurred.

×: Heat deformation harmful to practical application occurred.

Falling ball test:

A steel ball of 500 g was gravity-dropped on the decorative surface of each wheel cover at 23° C.

○: No cracking occurred at 50 cm.

×: Cracking occurred at 40 cm or less.

Product appearance:

The protuberances of welds on the decorative surface of each wheel cover and the gloss of the decorative surface were visually evaluated.

1: Beautiful. There was scarcely any protuberance of a weld.

2: Beautiful. There were small protuberances of welds but they do not matter in practical application.

3: The gloss was low and there were large protuberances of welds. Practical application was impossible.

As is clear from Tables 1 and 2, the wheel covers according to the present invention, product numbers Examples 2, 5, 6, 7, 9, 14 and 15, are excellent in both the falling ball test and the product appearance and are judged acceptable in the overall evaluation.

While the invention has been explained in detail and with reference to specific embodiments thereof, it is apparent to one of ordinary skill in the art that various changes and modifications can be made therein without departing from the spirit and scope thereof.

TABLE 2

| Test | Example 2 | Comparative Example 1 | Example 5 | Example 6 | Example 7 | Example 9 | Example 14 | Example 15 | Comparative Example C2 | Comparative Example C8 | Comparative ample C11 |
|---|---|---|---|---|---|---|---|---|---|---|---|
| Attachment-detachment repetition test | ○ | ○ | ○ | ○ | ○ | ○ | ○ | ○ | ○ | ○ | ○ |
| Heat resistance test | x | ○ | ○ | ○ | ○ | ○ | ○ | ○ | ○ | ○ | ○ |
| Falling ball test | x (30 cm) | ○ (>50 cm) | ○ (>50 cm) | ○ (>50 cm) | ○ (>50 cm) | ○ (>50 cm) | ○ (>50 cm) | ○ (>50 cm) | ○ (>50 cm) | x (20 cm) | x (30 cm) |
| Product appearance | 1 | 3 | 3 | 1 | 1-2 | 2 | 1 | 1 | 3 | 1 | 1 |

What is claimed is:

1. A glass-fiber-reinforced polypropylene resin composition comprising:

(A) at least one polypropylene resin;

(B) resin-coated glass fibers obtained by previously coating first glass fibers with a thermoplastic resin; and (C) second glass fiber, wherein the total content of the resins in the components (A) and (B) combined is about 65 to about 95% by weight based on the total weight of the components (A), (B) and (C), the total content (G) of the glass fibers in the components (B) and (C) combined is about 5 to about 35% by weight based on the total weight of the components (A), (B) and (C), and the melt flow rate M (g/10 min) of the polypropylene resin in component (A) and the total glass fiber content (G) satisfies the relationship:

$M < 1000/G$.

2. A composition according to claim 1, wherein the thermoplastic resin in the component (B) is a polypropylene resin.

3. A composition according to claim 2, wherein the length of the resin-coated glass fiber in component (B) is about 1 to 20 mm.

4. A composition according to claim 1, wherein the content of the thermoplastic resin in the component (B) is about 20 to about 80% by weight based on the weight of the component (B).

5. A composition according to claim 4, wherein the melt flow rate M (g/10 min) of the polypropylene resin in component (A) is about 1 to about 100, the total content of the resins in the components (A) and (B) combined is about 65 to about 85% by weight, and the total content (G) of the glass fibers in the components (B) and (C) combined is about 15 to about 35% by weight.

6. A composition according to claim 1, wherein the polypropylene resin is a combination of crystalline ethylene-propylene block copolymer and a modified crystalline polypropylene.

7. A composition according to claim 6, wherein the crystalline ethylene-propylene block copolymer contains about 3 to about 12% by weight of ethylene units, the modified crystalline polypropylene is about 2 to about 20% by weight based on the total weight of glass-fiber-reinforced polypropylene resin composition and the modified crystalline polypropylene is obtained by addition of maleic anhydride in a proportion of about 0.1 to about 2% by weight of the crystalline polypropylene.

8. A composition according to claim 2, wherein the polypropylene resin in component (A) is the same polypropylene resin in component (B).

9. A composition according to claim 1, wherein the amount of the glass fiber in the component (B) is less than that in the component (C).

10. A composition according to claim 1, wherein the length of the glass fiber in the component (B) is 1 to 20 mm, the diameter of the glass fiber in the component (B) is 10 to 25 mm, the length of the glass fiber in the component (C) is 1 to 10 mm, and the diameter of the glass fiber in the component (C) is 3 to 20 mm.

11. A composition according to claim 1, wherein the content of the component (C) is at least 2.5% by weight based on the total weight of the components (A), (B) and (C), and the content of the glass fibers in the component (D) is at least 2.5 wt % by weight based on the total weight of the components (A), (B) and (C).

12. A glass-fiber-reinforced polypropylene resin composition comprising:

(A) at least one polypropylene resin;

(B) resin-coated glass fibers obtained by previously coating first glass fibers with a thermoplastic resin; and (C) second glass fiber, wherein the total content of the resins in the component (A) and (B) combined is about 65 to about 95% by weight based on the total weight of the components (A), (B) and (C), the total content (G) of the glass fibers in the components (B) and (C) combined is about 5 to about 35% by weight based on the total weight of the components (A), (B) and (C), and the melt flow rate M (g/10 min) of the polypropylene resin in component (A) and the total glass fiber content (G) satisfies the relationship:

M<1000/G wherein the thermoplastic resin in the component (B) is a polypropylene resin, and wherein the content of the component (C) is at least 2.5% by weight based on the total weight of the components (A), (B) and (C), and the content of the glass fibers in the component (D) is at least 2.5 wt % by weight based on the total weight of the components (A), (B) and (C).

* * * * *